United States Patent [19]
Jewett et al.

[11] 4,196,337
[45] Apr. 1, 1980

[54] METHOD OF FABRICATING A TORQUE SENSOR

[75] Inventors: Charles S. Jewett, Lyme; Harry L. Ruzicka, Easton, both of Conn.

[73] Assignee: Avco Corporation, Stratford, Conn.

[21] Appl. No.: 918,565

[22] Filed: Jun. 23, 1978

[51] Int. Cl.² ............................................... B23K 9/00
[52] U.S. Cl. .......................................... 219/121 EM
[58] Field of Search ................. 219/121 EB, 121 EM, 219/121 L, 121 LM; 73/136 R, 134, 133 R

[56] References Cited

U.S. PATENT DOCUMENTS

| 2,845,795 | 8/1958 | Emmerling | 73/134 X |
| 3,458,683 | 7/1969 | Canonico et al. | 249/121 EBM |
| 3,623,129 | 11/1971 | Miles | 219/121 EB |

FOREIGN PATENT DOCUMENTS

| 2214223 | 3/1972 | Fed. Rep. of Germany | 73/133 |
| 584203 | 12/1977 | U.S.S.R. | 338/5 |

*Primary Examiner*—C. L. Albritton
*Attorney, Agent, or Firm*—Ralph D. Gelling

[57] ABSTRACT

The invention relates to a method of fabricating a torque sensor to which are applied strain gauges, with the torque sensor being adapted to be coupled between an engine and an absorption dynamometer for use in measuring the torque output of the engine. The subject process results in an integral assembly of two cylindrical rings interconnected by a plurality of elongated bars or beams to which the strain gauges are attached. During the process, a plurality of spaced holes are simultaneously drilled in the two identical, cylindrical rings, after which the rings and beams are assembled such that the rings are disposed in spaced relationship, and with the elongated beams extending between the rings. The beams are connected to the rings by electron beam welding so as to form an integral torque sensor assembly.

8 Claims, 5 Drawing Figures

METHOD OF FABRICATING A TORQUE SENSOR

The subject invention relates to a method of fabricating a torque sensor, and more particularly a method of fabricating a torque sensor from a plurality of parts utilizing an electron beam welding process.

A torque sensor is used for measuring the torque output of an engine, such as an aircraft engine. The torque sensor basically comprises two cylindrical rings having their longitudinal axes colinear, and interconnected by a plurality of beams or bars which extend parallel to the longitudinal axes of the rings, and which include flat portions to which strain gauges are attached. One of the rings of the torque sensor is attached to an absorption dynamometer which could be an air turbine or a water brake, while the other ring is attached to the engine structure. During the testing procedure, the relative torsional movement between the absorption dynamometer and the engine results in a twisting or torsional movement of the beams of the torque sensor, which movement is detected by the strain gauges, and the output signals of the strain gauges are provided to suitable electronics for determining the engine torque.

Prior art torque sensors are fabricated from a single forged cylindrical block of metallic material. In the prior art process, the forged block of steel is initially rough-machined, then magnafluxed to insure that it does not have any inclusions or flaws in it, and then it is subsequently rough-machined to define the rings of the resulting torque sensor. Next, the center portion of the cylindrical forging is hogged out in order to rough-machine the four beams interconnecting the rings. At this point, the forging is heat-treated to a sufficient Rockwell hardness, just below the machinability index of the machining tools, so as to increase the stress-strain capability of the resulting torque sensor. Because of the differential size between the large mass of the end rings, and the relatively small size of the beams, it may be necessary to utilize specialized heat treating means, such as a heat treat die or heat treat fixture, to compensate for the differential size in the rings and the bars during heat treating of the forging. At this point the forging is carefully inspected to insure that there are no flaws which, of course, would affect the efficiency of the torque sensor in accurately transmitting the differential torque between the engine and the dynamometer. After further magnafluxing and machining, the resulting torque sensor generally comprises two cylindrical rings interconnected by four beams, each of which is generally rectangular in cross-section. As can be readily appreciated, because of the fact that the prior art torque sensor is formed of a single unitary forging, the center portion of the forging must be removed to form the beams. Hence, in view of space limitations, usually no more than four beams are formed in the resulting torque sensor. In addition, because of the machinability and extensive work required on the forging usually the forging is made of a steel material, rather than a stainless steel material which is more difficult to fabricate. Accordingly, the prior art torque sensor is susceptible to rusting, and the rusting may cause the strain gauges to lift or delaminate from the torque sensor, thereby requiring the resetting of the strain gauges. Because of the fact that the strain gauges mounted on a torque sensor are small, on the order of less than one-half of an inch in length, and said strain gauges must be finely tuned and precisely mounted, the cost of installing strain gauges on a torque sensor is expensive. Thus, each time that a gauge delaminates or lifts from the torque sensor, a substantial amount of cost is involved in remounting and recalibrating the gauges. Another shortcoming of the prior art torque sensor is the fact that the resulting torque sensor must be virtually flawless, and accordingly during the course of the fabrication of the torque sensor from a single steel forging, a great deal of care must be exercised at all stages of the prior art fabrication process, or else the entire forging must be discarded. As a result the cost of manufacturing of a prior art forging is costly. In addition, because of the great deal of machining and working of the cylindrical forging to form the prior art torque sensor, variations in the size of the beams, or the rings, may occur, depending on the skill of the machinist, and the accuracy of the machines employed for the fabrication of the torque sensor. As is readily apparent, uniformity of cross-section of the rings and the beam sections, as well as the spacing between the rings, and all of the dimensions of the torque sensors are of utmost importance in order to insure that the test results are accurate.

It is an object of the subject invention to provide a new and improved process for forming the non-gauged portion of a torque sensor, and more particularly to provide a manufacturing process for producing a torque sensor by the fabrication of individual pieces followed by interconnection of such pieces, by electron beam welding, thereby greatly reducing the manufacturing cost of the resulting torque sensor.

It is also an object of the subject invention to provide a new and improved manufacturing process for forming a torque sensor wherein uniformity of beam cross-section is achieved, as well as greater flexibility in manufacturing by size torque element, including different beam sizes and number of beam torque elements extending between the rings.

It is a further object of the subject invention to provide a method of manufacturing a torque sensor including bar members which are hollow to allow thermostatically controlled liquid to be passed therethrough in order to maintain the beams at a fixed temperature to obviate temperature fluctuation of the strain gauges, and epoxy used for bonding the strain gauges to the beams during a measurement test.

Other objects and advantages of the subject process will become apparent from a reading of the following detailed description taken in conjunction with the drawings in which.

Figure 1:
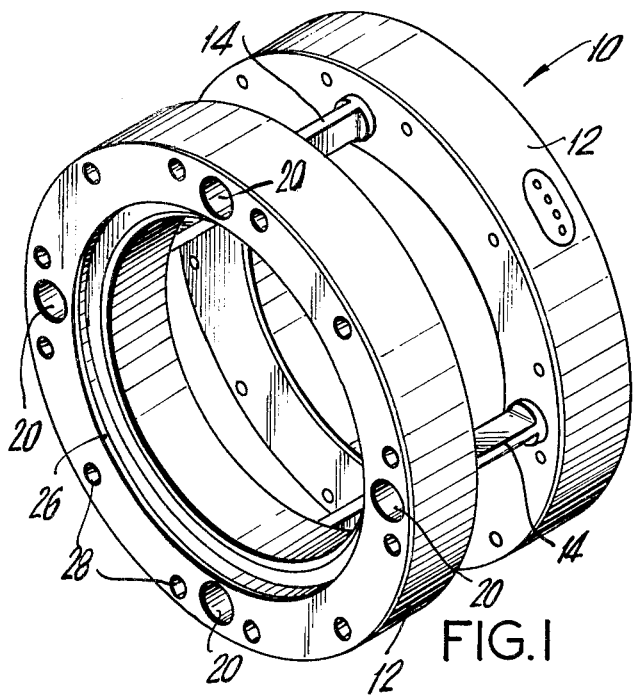
FIG. 1 is a perspective view of a torque sensor made by the process of the subject invention.
Figure 2:
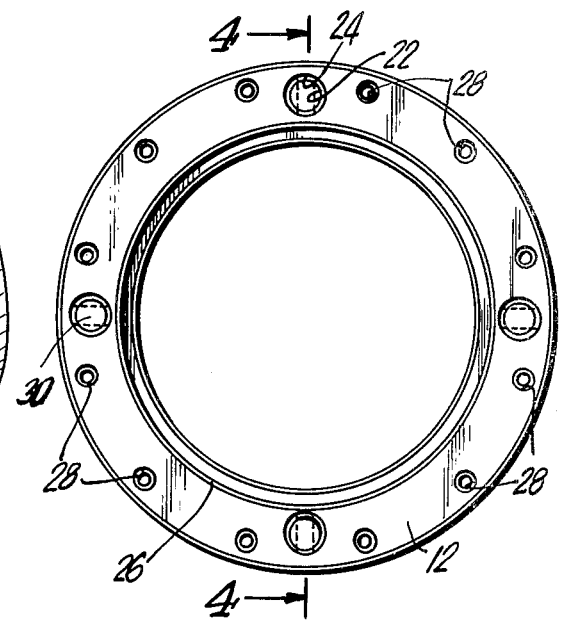
FIG. 2 is an elevational end view of a torque sensor made according to the process of the subject invention.

Turning to FIG. 1, the torque sensor made according to the process of the subject invention is generally designated by the numeral 10, and basically two cylindrical rings 12, 12 interconnected by a plurality of bars or beams 14. The rings 12 are preferably formed from a flat plate of stainless steel material utilizing conventional manufacturing techniques, with the resulting configuration of each ring 12 having a generally rectangular cross-section (see FIG. 4). In the embodiment illustrated, each ring 12 includes four holes 20 for engagement with the beams 14, with the holes 20 being spaced at 90° intervals about the circumference of the ring. The axes of the holes 20 are parallel to the central axis of the ring 12, and each hole includes a smaller diameter portion 22 which engages one end of a beam 14, and a counterbore portion 24 which is disposed on the outside face of the ring 12 as assembled in the torque sensor 10. The ring 12 is also formed on its outside face with an annular undercut, designated 26, for engagement with the engine mount or dynamometer mount when mounted for a testing procedure. Also disposed about the circumference of each ring 12 and extending parallel to the central axis of the ring 12 are a plurality of holes 28 which receive bolt means for connecting the torque sensor 10 to the engine mount or dynamometer mount.

Figure 3:
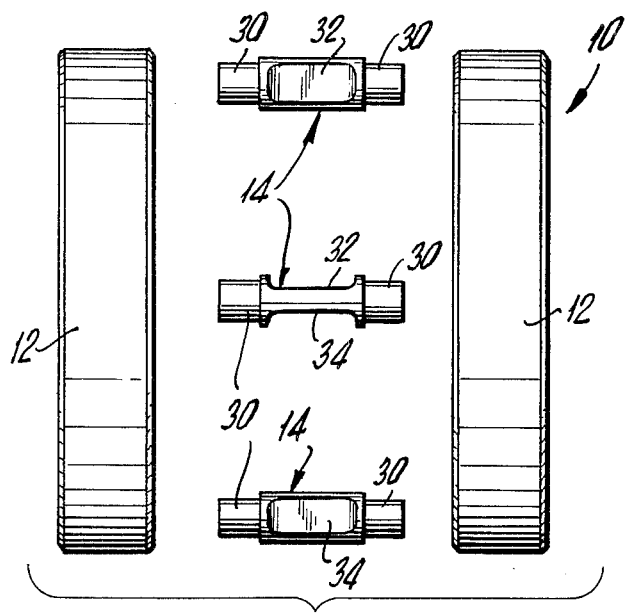
FIG. 3 illustrates the elements of a torque sensor made according to the process of the subject invention at an intermediate step of the subject process.
Figure 4:
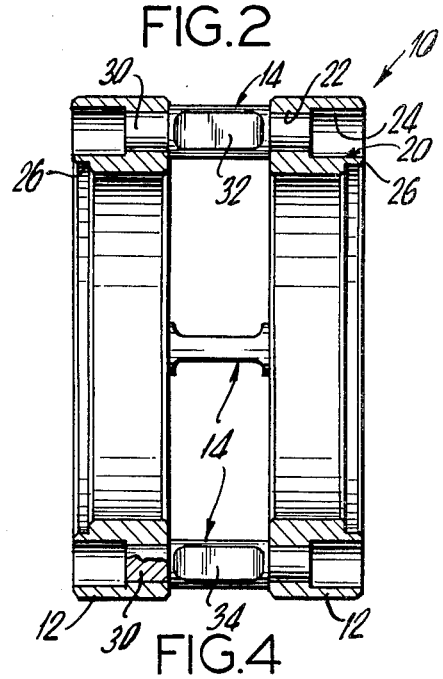
FIG. 4 is a sectional view taken along line 4—4 in FIG. 2.

Each beam 14 is of generally cylindrical configuration with its longitudinal axis being parallel to the longitudinal axis of the associated ring 12. As shown in FIG. 3, each beam 14 includes opposed ends 30, 30 of a diameter substantially corresponding to the smaller diameters 22 of the holes 20, and an intermediate portion including upper flat 32 and lower flat 34. Flats 32 and 34 are parallel to one another, and are the surfaces onto which the strain gauges are mounted. As illustrated in FIGS. 3 and 4, the plane of the flats 32 and 34 of the four beams 14 are disposed perpendicular to the planes of the flats of adjacent beams 14, 14 and parallel to the planes of the flats of opposed beam 14. The disposition of the flats 32 and 34 of the beams 14 is, of course, of utmost importance with respect to the proper disposition of the strain gauges in order to achieve accurate readings of the torque developed during the course of a test. Although the embodiment illustrated in the figures includes four beams, it is readily apparent that six beams, spaced at 60° intervals about the circumference of the rings 12, 12 may be provided, with the flats of such beams being properly oriented.

In the process of the subject invention, first the individual components consisting of the rings 12, 12 and the beams 14 are formed. Each ring 12 may be formed from a flat plate of stainless steel material utilizing conventional manufacturing techniques, and after at least two rings have been formed, the two rings may be placed one above the other, and the holes 20 may be simultaneously drilled in order to insure accurate alignment of the holes 20 in the two rings. The holes 20 may be then counterbored as at 24, and the additional holes 28 may be also simultaneously drilled in the two rings 12, 12.

In the manufacture of the individual beams 14, since such beams are separate and distinct from the rings 12 at this stage in the process, the accuracy of the flats 32 and 34 may be precisely controlled, as well as the diamter of the opposed ends 30, 30. This is in sharp contrast to the prior art process of manufacturing a torque sensor, where a single block of forged material is machined and hogged out in order to form the beams interconnecting the two end rings.

Figure 5:
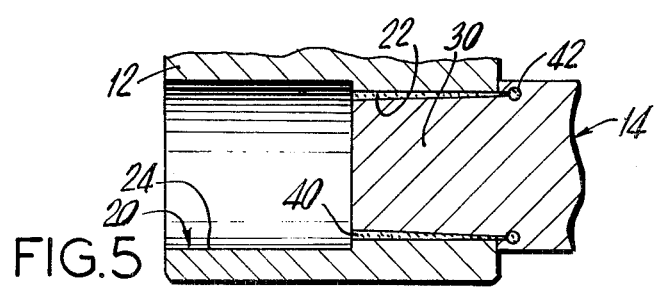
FIG. 5 is a partial sectional view of the electron beam welded connection between a beam and an end ring of a torque sensor made according to the process of the subject invention.

In the next step of the process, the individual beams 14 and the end rings 12 are aligned, as shown in FIG. 3, and then press fit together, with the ends 30 of the beams engaging the smaller diameter holes 22 of the holes 20 in the rings 12, and with the counterbores 24 being on the outside surfaces of the rings 12. The flats 32, 34 of the beams are accurately aligned, utilizing a suitable mounting jig or the like, and next the ends 30 of the beams are electron beam welded to the end rings 12. As shown in FIG. 5, the resulting electron beam welded connection between a beam 14 and a ring 12 is defined by a generally cylindrical welded connection between the elements, as designated by the numeral 40. Electron beam welding is preferred for the interconnection of the beams 14 to the rings 12 since electron beam welding is a fusion welding process, and there is no practical limit to the thickness of metal than may be electron beam welded. A current of 10 ma with 150,000 volts is sufficient to weld on inch thick stainless steel, with full penetration. The resulting width of the fusion zone, although about 1/32 of an inch initially, tapers to only a few thousandths of an inch at a depth of one inch. It is noted that an electron accelerated by 100,000 volts finally reaches a velocity of about half the speed of light, and at such velocities, impact of the electron on the workpiece melts and even boils the stainless steel metal. As the electrons travel deeper into the material, they are scattered and stopped by collisions with the atoms of the crystal structure, thus heating a pear-shaped volume of metal. As also illustrated in FIG. 5, the resulting pear-shaped, cylindrical volume of metal is indicated by the numeral 42. The electron beam welding step is carried out in an evacuated atmosphere, which may be charged with nitrogen, to preclude any oxidation which would be detrimental to the formation of a sound joint. The resulting welded joint 40 is cylindrical in configuration, as shown in FIG. 5.

Electron beam welding is particularly suited for the subject process since it has the advantages of the absence of weld contamination, very low distortion and shrinkage of the mating metals (i.e., beams 14 and rings 12), as well as the accessability of the electron beam to the confined spaces of the interconnection of the beams and rings. The counterbored hole 24 aid in focusing of the electron beam in the cylindrical joint between the beams 14 and the rings 12 from the exterior surface of the rings 12. Electron beam welding also has the advantage that no pre-heat is required, and the welding operation is carried out at high speeds. Only one pass is required to achieve the weld, and there is very little heat input to the parts to be mated. As a result, there is little or no permanent distortion or shrinkage of the elements, which is of extreme importance considering the stringent requirements for the structural and dimensional characteristics of the torque sensor 10. The electron beam welding technique provides maximum assurance of total joining, thereby avoiding slippage which could cause inaccuracies in the torque indication.

Following the final testing of the torque sensor 10, the strain gauges may be suitably mounted to the flats 32, 34 of the beams 14, and the torque sensor may then be fixed in place for testing of an engine.

Accordingly, there is provided a new and improved process for manufacturing the non-gauged portion of a torque element. The subject process results in a torque sensor that is fabricated through individual pieces and utilizes electron beam welding for connecting said pieces. The manufacturing cost utilizing the process of the subject of the subject invention is substantially less than the prior art processes wherein a large block of forged material was extensively machined to define the torque sensor. The use of individual components facilitates the procuring of materials for manufacturing the torque sensor according to the subject invention, and individual components may be manufactured and stored for future use as required. Furthermore, since the beams 14 are individually made, as contrasted to being a unitary portion of a large block of material, as in the prior art, greater uniformity of the beam cross-section may be achieved, and such uniformity is essential for accuracy in the resulting torque measurements. Uniformity of the beam sections also facilitates the mounting of the strain gauges, as well as the adjustment thereof, and more accurate test measurements. The round cross-section of the beams, as contrasted to the generally rectangular cross-sections of beams of torque sensors made according to the prior art process, greatly eliminates stress concentrations and stress risers in the beams, thereby further adding to the accuracy of the torque sensor. In addition, greater flexibility is afforded in manufacturing any range torque element, such as by having different length beams capable of being secured to standard size rings. The torque sensor 10 may be made with any number of beam torque elements, either four, six or any other number as desired. It is also noted that the beams 14 may be provided with a longitudinally-extending, through-hole in communication with the counterbores 24 in the opposed rings 12. Thermostatically controlled liquid may be continually circulated through the torque sensor, and more particularly through the hollow beams 14, thereby allowing the beam temperature to be maintained at a fixed level so as to obviate any fluctuation in the temperature of the strain gauges. In addition, the temperature controlled beams will aid in insuring that there is no temperature fluctuation in the epoxy which is employed for bonding the strain gauges to the beams.

While the invention has been described in connection with several preferred procedures, it will be understood that it is not intended to limit the invention to those procedures. On the contrary, it is intended to cover all alternatives, modifications, and changes as may be included within the spirit and scope of the invention as defined by the appended claims.

What is claimed is:

1. A method of fabricating a torque sensor to be coupled between an engine and an absorption dynamometer for use in measuring the torque output of the engine comprising the steps of:
   fabricating two identical, stainless steel cylindrical rings, each having a generally rectangular cross-section;
   simultaneously drilling a plurality of spaced holes in each ring extending parallel to the longitudinal axis thereof, such that the holes in one ring are aligned with the holes in the other ring;
   fabricating a plurality of elongated, cylindrical beams corresponding to the plurality of holes in the rings, with the diameter of said beams substantially corresponding to the diameter of the holes in the rings;
   assembling said rings and beams such that the rings are disposed in spaced relationship and have their longitudinal axes colinear, and wherein the elongated cylindrical beams extend between said rings, with the opposite ends of said beams being disposed in the respective aligned holes of the rings;
   securing said rings and beams together by electron beam welding to form an integral assembly; and
   machining flat portions on the beams intermediate the length thereof for mounting of strain gauges thereon.

2. A method of fabricating a torque sensor as in claim 1 wherein four spaced holes are drilled into each ring, said holes being spaced at 90° intervals about the circumference of said ring.

3. A method of fabricating a torque sensor as in claim 1 wherein six holes are drilled into each ring, said holes being spaced at 60° intervals about the circumference of the rings.

4. A method of fabricating a torque sensor as in claim 1 wherein the spaced holes in each ring are counterbored, prior to the assembly of said rings and beams, and with the counterbored holes being disposed on the outside faces of the rings in the resulting assembled construction of the torque sensor.

5. A method of fabricating a torque sensor as in claim 1 wherein additional holes are provided in the rings for attachment to the engine and dynamometer, prior to the assembly of said rings and beams.

6. A method of fabricating a torque sensor as in claim 1 wherein said two identical, stainless steel cylindrical rings are machined from a sheet of flat stainless steel stock.

7. A method of fabricating a torque sensor as in claim 1 wherein the planes of the flat portions on each beam are disposed perpendicular to the planes of the flats on the adjacent beams.

8. A method of fabricating a torque sensor to be coupled between an engine and an absorption dynamometer for use in measuring the torque output of the engine comprising the steps of:
   fabricating two identical cylindrical rings, each ring having a generally rectangular cross-section;
   providing a plurality of spaced holes in each ring extending parallel to the longitudinal axis thereof, with the holes in one ring being aligned with the holes in the other ring;
   fabricating a plurality of elongated cylindrical beams corresponding to the plurality of holes in a ring, with the cross-section of said beams substantially corresponding to the cross-sections of the holes in the rings;
   assembling said rings and beams, with the rings being disposed in spaced relationship and having their longitudinal axes colinear, and with said elongated beams extending between said rings, the opposite ends of said beams disposed in the respective aligned holes of the ring;
   securing said rings and beams together by electron beam welding to form an integral assembly; and
   machining flat portions on the beams, intermediate the length thereof for mounting of strain gauges thereon, the planes of the flat portions on each beam being disposed 90° relative to the planes of the flats on the adjacent beams.

* * * * *